(12) United States Patent
Lan et al.

(10) Patent No.: US 9,939,851 B2
(45) Date of Patent: Apr. 10, 2018

(54) ELECTRONIC DEVICE AND HINGE THEREOF

(71) Applicant: Compal Electronics, Inc., Taipei (TW)

(72) Inventors: Wei-Hao Lan, Taipei (TW); Tzu-Fang Huang, Taipei (TW); Jyh-Chyang Tzou, Taipei (TW); Hsin Yeh, Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 15/351,451

(22) Filed: Nov. 15, 2016

(65) Prior Publication Data

US 2017/0139446 A1    May 18, 2017

Related U.S. Application Data

(60) Provisional application No. 62/255,536, filed on Nov. 16, 2015.

(51) Int. Cl.
*E05D 1/04* (2006.01)
*E05D 3/06* (2006.01)
(Continued)

(52) U.S. Cl.
CPC .............. *G06F 1/1681* (2013.01); *E05D 3/18* (2013.01); *E05D 7/12* (2013.01); *E05D 11/082* (2013.01);
(Continued)

(58) Field of Classification Search
CPC ............... Y10T 16/544; Y10T 16/5443; Y10T 16/5444; Y10T 16/5445; Y10T 16/5448; Y10T 16/547; Y10T 16/542; Y10T 16/53832; Y10T 16/53833; Y10T 16/53888; Y10T 16/53845; G06F 1/16; G06F 1/1616; G06F 1/1681; G06F 1/166; G06F 1/1679; H04M 1/022; H04M 1/0214; H04M 1/0216; H04M 1/0222; H05K 5/0226; F16M 11/10; F16M 11/2021; E05D 11/1021; E05D 11/1078; E05D 11/082; E05D 3/18; E05D 3/122; E05D 3/12; E05D 3/16; E05D 3/06; E05D 3/32; E05D 7/12;
(Continued)

(56) References Cited

U.S. PATENT DOCUMENTS 4,068,348 A * 1/1978 Chivers ..................... E05D 3/12
16/235
4,843,680 A * 7/1989 Cress ....................... E05D 3/186
16/237

(Continued)

FOREIGN PATENT DOCUMENTS

TW    201428197    7/2014
TW    M1501468    5/2015

*Primary Examiner* — Chuck Mah
(74) *Attorney, Agent, or Firm* — Chieh-Mei Wang (57) ABSTRACT

An electronic device and a hinge thereof are disclosed. The hinge includes a base, a first link, a second link, a third link and an elastic member. The first link is pivoted to the base and rotatable about a first axis. The first link includes a first groove. The second link is pivoted to the base and rotatable about a second axis. The third link includes a first end pivoted to the second link and a second end slidably joined to the first groove. The elastic member is disposed between the second link and the third link and propped against the second link and the third link.

16 Claims, 9 Drawing Sheets

(51) Int. Cl.
   *G06F 1/16* (2006.01)
   *F16M 11/20* (2006.01)
   *E05D 3/18* (2006.01)
   *E05F 1/12* (2006.01)
   *E05D 11/08* (2006.01)
   *E05D 7/12* (2006.01)

(52) U.S. Cl.
   CPC ....... *E05F 1/1207* (2013.01); *F16M 11/2021* (2013.01); *G06F 1/166* (2013.01); *G06F 1/1626* (2013.01); *E05Y 2900/606* (2013.01)

(58) Field of Classification Search
   CPC ......... E05D 15/28; E05D 15/30; E05D 15/32; E05D 15/40; E05D 1/04; E05D 2001/045; E05F 1/1207; E05Y 2900/606
   See application file for complete search history.

(56) References Cited

U.S. PATENT DOCUMENTS

| | | | | |
|---|---|---|---|---|
| 4,960,256 A * | 10/1990 | Chihara | ................ | G06F 1/1616 16/361 |
| 5,062,182 A * | 11/1991 | Griffiths | ................... | E05D 3/18 16/302 |
| 6,269,521 B1 * | 8/2001 | Gabel | .................... | E05D 3/145 16/287 |
| 6,402,109 B1 * | 6/2002 | Dittmer | ................. | F16M 11/10 248/279.1 |
| 6,604,722 B1 * | 8/2003 | Tan | ........................ | F16M 11/10 248/276.1 |
| 7,011,285 B2 * | 3/2006 | Wang | .................... | F16M 11/10 248/673 |
| 7,845,053 B2 * | 12/2010 | Marsh | ..................... | E05D 11/06 16/286 |
| 8,108,971 B2 * | 2/2012 | Florek | ...................... | E05D 1/04 16/193 |
| 8,763,206 B1 * | 7/2014 | Gong | ........................ | E05D 1/04 16/355 |
| 8,943,651 B2 * | 2/2015 | Hsu | ...................... | H05K 5/0226 16/366 |
| 9,304,549 B2 * | 4/2016 | Siddiqui | ................... | E05D 7/00 |
| 9,366,064 B1 * | 6/2016 | Chen | ........................ | E05D 3/12 |
| 9,404,298 B1 * | 8/2016 | Chen | .................... | G06F 1/1681 |
| 2011/0023272 A1 * | 2/2011 | Huang | ..................... | E05D 3/18 16/362 |
| 2016/0083989 A1 * | 3/2016 | Kuo | ........................ | E05D 1/04 16/355 |
| 2016/0319581 A1 * | 11/2016 | Lin | ....................... | G06F 1/1681 |

* cited by examiner

ELECTRONIC DEVICE AND HINGE THEREOF

FIELD OF THE INVENTION

The invention relates to an electronic device and a hinge thereof, and more particularly to a hinge capable of quickly forming a desired angle between links through an elastic member and an electronic device utilizing the hinge to quickly form a desired angle with its stand.

BACKGROUND OF THE INVENTION

Figure 1A:
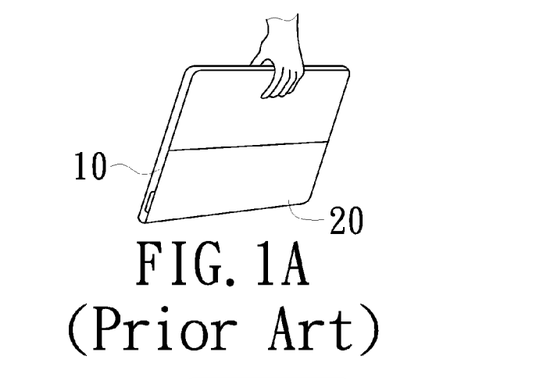
FIGS. 1A-1D depict operation of a conventional tablet, wherein a stand is lifted and rotated to a predetermined angle.
Figure 1B:
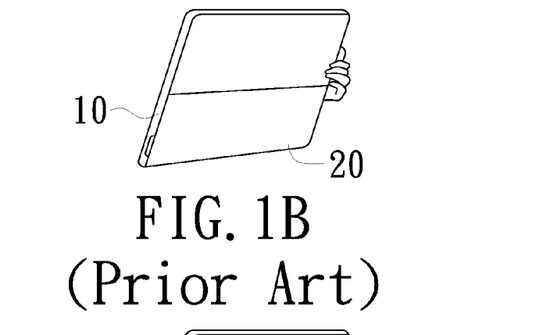
Figure 1C:
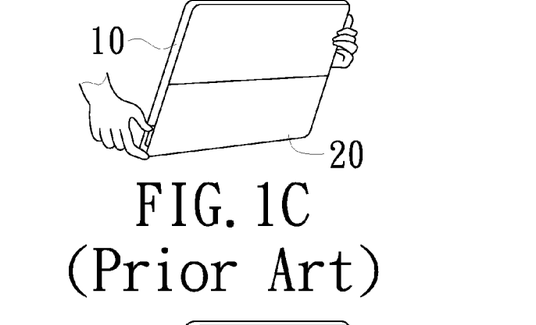
Figure 1D:
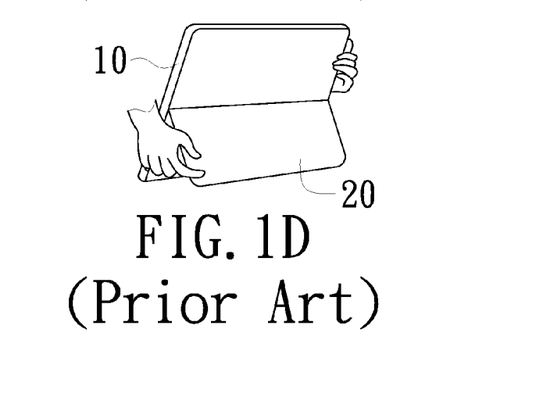

Hinges are often used in electronic devices, for example a hinge often connects a display and a host of a laptop. A stand is mounted to a housing of a tablet to support the tablet, and a hinge is used to connect the stand and the housing. FIGS. 1A to 1D show a stand 20 of a conventional tablet 10 lifted and rotated to a predetermined angle. As shown in FIGS. 1A and 1B, the tablet 10 is taken out by a user and then held by one hand of the user. Afterwards, as shown in FIG. 1C, the user uses the other hand to lift the stand 20 and prepares to rotate it. Finally, the stand 20 is rotated by the user to the predetermined angle as shown in FIG. 1D.

The conventional tablet 10 must be operated by two hands to lift and rotate the stand 20 to the predetermined angle, and more than two steps are necessary to complete the operation.

SUMMARY OF THE INVENTION

An object of the invention is to provide a hinge capable of rotating links to form a desired angle therebetween through an elastic member. When the hinge is applied to an electronic device such as a tablet, a stand and a housing of the tablet are mounted to different links which can be rotated to form a proper angle through the elastic member, whereby a user can operate the tablet only by one hand to rotate the stand to a proper angle, and only one step is needed to complete the operation.

The invention provides a hinge. The hinge in accordance with an exemplary embodiment of the invention includes a base, a first link, a second link, a third link and an elastic member. The first link is pivoted to the base and rotatable about a first axis. The first link includes a first groove. The second link is pivoted to the base and rotatable about a second axis. The third link includes a first end pivoted to the second link and a second end slidably joined to the first groove. The elastic member is disposed between the second link and the third link. The elastic member is propped against the second link and the third link.

In an embodiment of the invention, the elastic member is a torsion spring and disposed in a position where the second link is pivoted to the third link, and the torsion spring includes two ends propped against the second link and the third link respectively.

In an embodiment of the invention, the first link extends in a first direction perpendicular to the first axis, and the first groove extends in a direction parallel to the first direction.

In an embodiment of the invention, the elastic member enables the third link to rotate relative to the second link and enables the first link to rotate relative to the base until the second end of the third link is stopped by an end of the first groove, and a first angle is formed between the first link and the base when the second end is stopped by the end of the first groove.

In an embodiment of the invention, the first angle is 30°.

In an embodiment of the invention, the hinge further includes a first sliding member coupled to the first link. The base includes a second groove arced in shape and corresponding to a center passed through by the first axis, and the first sliding member is adapted to slide within the second groove so as to rotate the first link relative to the base about the first axis.

In an embodiment of the invention, the first link rotates relative to the base about the first axis in a first angular range.

In an embodiment of the invention, the first angular range ranges from 30° to 90°.

In an embodiment of the invention, the hinge further includes a second sliding member. The first sliding member includes a third groove arced in shape and corresponding to the center, and the second sliding member is connected to the first link and adapted to slide in the third groove so as to rotate the first link relative to the base about the first axis.

In an embodiment of the invention, the first link rotates relative to the base about the first axis in a second angular range.

In an embodiment of the invention, the second angular range ranges from 90° to 150°.

In an embodiment of the invention, the hinge further includes a cover covering a lateral side of the second groove to keep the first sliding member to slide within the second groove.

In an embodiment of the invention, the hinge further includes a friction washer and at least one spring washer. The friction washer is disposed in a position where the second link is pivoted to the base and sandwiched between the second link and the base, and the spring washer is disposed in the position where the second link is pivoted to the base. The spring washer is against the second link.

In an embodiment of the invention, the first axis is parallel to the second axis.

The invention further provides an electronic device. The electronic device in accordance with an exemplary embodiment of the invention includes a main body, a stand and a hinge described above. The stand is connected to the first link, and the main body is connected to the base.

In an embodiment of the invention, the electronic device further includes a latch latching the stand to the main body when the first link is rotated to be parallel to the base.

The electronic device of the invention utilizes the hinge to connect the main body and the stand. Because the elastic member can move the stand to a predetermined angle, the user can operate the electronic device to lift the stand with only one hand. It is very convenient for the user. A virtual axis formed by the first sliding member and the second sliding member slidable within the second groove and the third groove provides a seamless structure between the stand and the main body.

A detailed description is given in the following embodiments with reference to the accompanying drawings.

BRIEF DESCRIPTIONS OF THE DRAWINGS

The invention will become more readily apparent to those ordinarily skilled in the art after reviewing the following detailed description and accompanying drawings, in which.

DETAILED DESCRIPTION OF PREFERRED EMBODIEMENTS

Figure 2A:
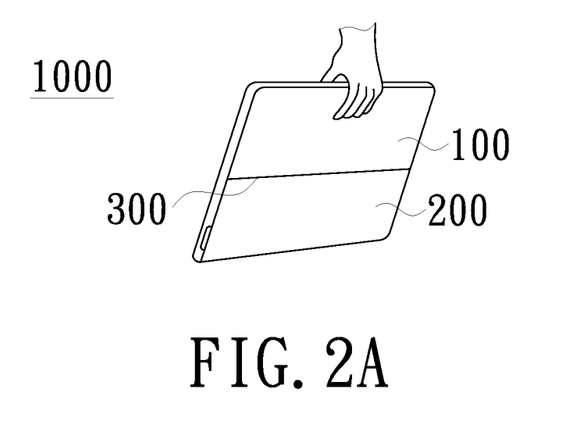
FIGS. 2A and 2B depict operation of an embodiment of an electronic device of the invention, wherein a stand is lifted and rotated to a predetermined angle.
Figure 2B:
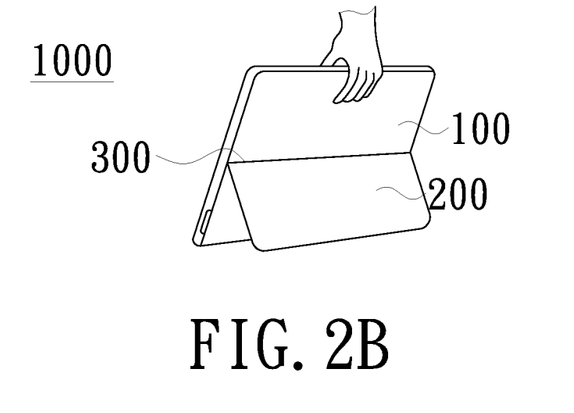

Referring to FIGS. 2A and 2B, an electronic device 1000 of the invention includes a main body 100, a stand 200 and a hinge 300. The electronic device 1000 may be a tablet, but it is not limited thereto. The stand 200 is pivoted to the main body 100 through the hinge 300 and therefore is rotated relative to the main body 100. In this embodiment, the stand 200 is mounted onto a rear surface of the main body 100, and a display device is mounted onto a front surface of the main body 100. The strand 200 rotates by an appropriate angle and thus supports the main body 100 to maintain an inclined posture relative to a desk surface so as to facilitate operation of the electronic device 1000 for a user, such as touching or viewing the display device. The stand 200 can be rotated and received in the main body 100. In this embodiment, the stand 200 is rotated to flush with the main body 100 and therefore received in the main body 100. The stand 200 is then positioned to the main body 100 by a latch. The latch can be magnetic type or mechanical type, but it is not limited thereto. When a user uses the electronic device 1000, as shown in FIG. 2A, he/she can hold the main body 100 with only one hand, and afterwards releases the latch. When the latch is released, the stand 200 becomes rotatable relative to the main body 100. Since the stand 200 is rotated relative to the main body 100 through the hinge 300, the detailed structure of the hinge 300 and the rotation of the stand 200 relative to the main body 100 are described as follows.

Figure 3A:
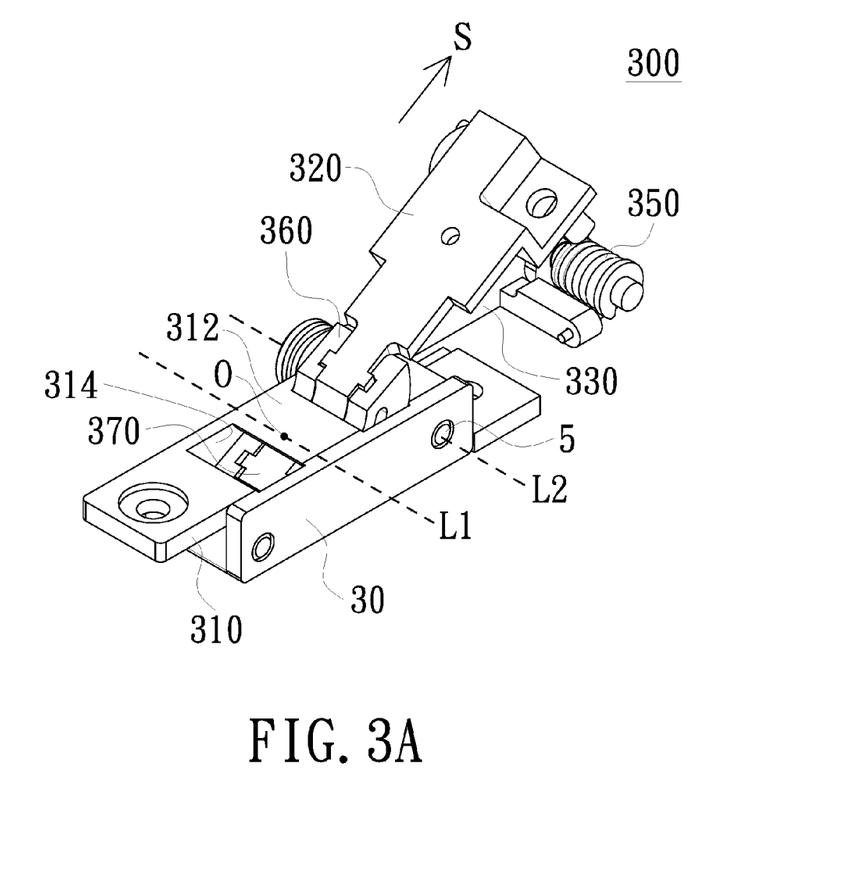
FIGS. 3A and 3B are three-dimensional views of an embodiment of a hinge of the invention.
Figure 3B:
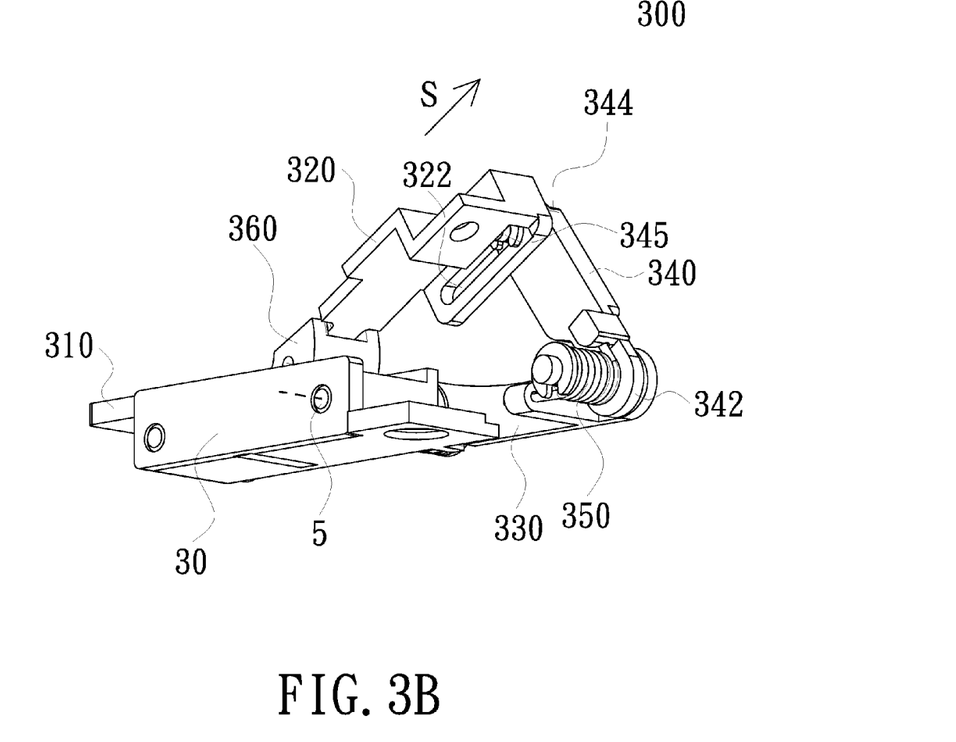
Figure 4:
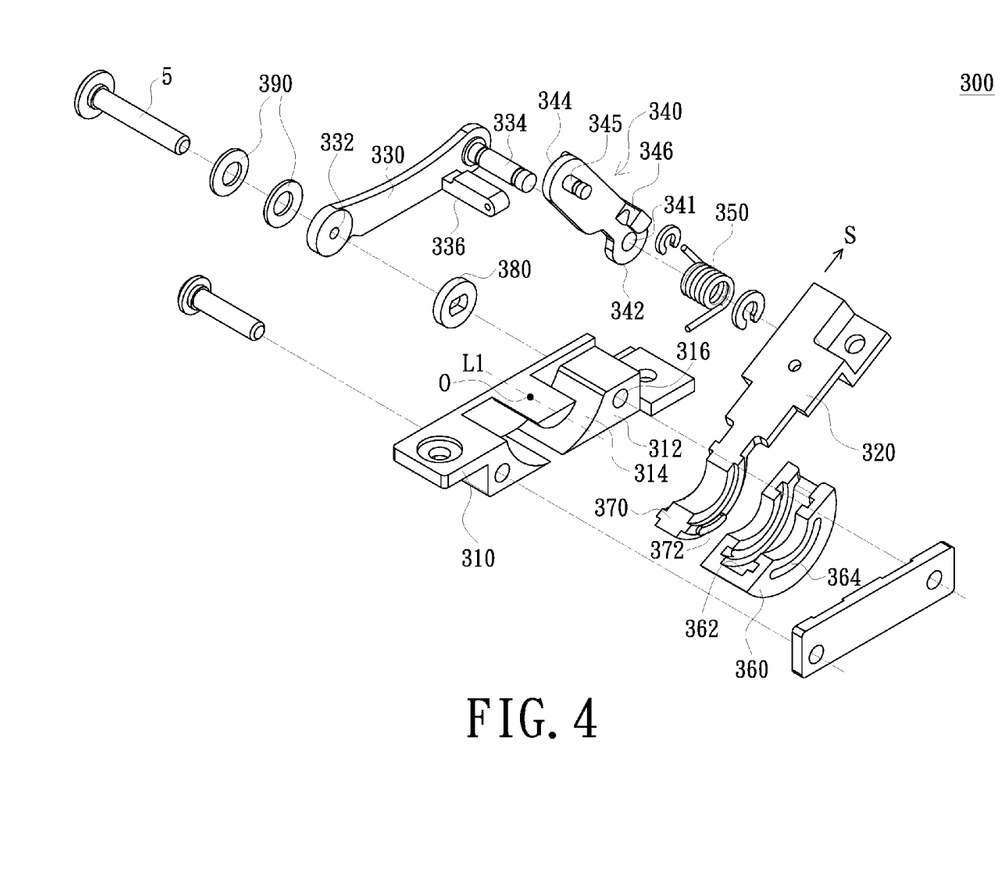
FIG. 4 is an exploded view of the hinge of FIGS. 3A and 3B.

Referring to FIGS. 3A, 3B and 4, an embodiment of the hinge 300 includes a base 310, a first link 320, a second link 330, a third link 340 and an elastic member 350. The first link 320 is pivoted to the base 310 and rotatable about a first axis L1. The first link 320 includes a first groove 322. The second link 330 is pivoted to the base 310 and rotatable about a second axis L2. The third link 340 includes a first end 342 pivoted to the second link 330 and a second end 344 slidably joined to the first groove 322. The elastic member 350 is disposed between the second link 330 and the third link 340 and propped against the second link 330 and the third link 340. The first link 320 can move relative to the third link 340 through the first groove 322, and thus the first link 320, the second link 330 and the third link 340 can be rotated to become parallel to the base 310 and received in the base 310. When the first link 320, the second link 330 and the third link 340 are rotated by an external force to become parallel to the base 310, the elastic member 350 deforms elastically. When the external force is removed, the elastic force of the elastic member 350 exerts on the third link 340 and rotates the third link 340 by an angle. Because the second end 344 of the third link 340 is slidable within the first groove 322 of the first link 320, the third link 340 pushes the first link 320 to rotate relative to the base 310 until the second end 344 of the third link 340 is stopped by an end of the first groove 322. When the second end 344 of the third link 340 is stopped by the end of the first groove 322, a first angle is formed between the first link 320 and the base 310.

In this embodiment, the base 310 includes a main body 312. The main body 312 may be a cuboid, but it is not limited thereto. A second groove 314 is formed within the main body 312. The second groove 314 is arced and corresponds to a center O. The second groove 314 has two ends opened to a top of the main body 312. The first axis L1 extends through the center O, and the second groove 314 is also opened to a lateral side of main body 312. In this embodiment, the hinge 300 further includes a first sliding member 360 slidabe within the second groove 314. One end of the first link 320 is coupled to the first sliding member 360. In this embodiment, the first sliding member 360 is also arced and has a shape corresponding to the shape of the second groove 314, and thus the first sliding member 360 is slidable within the second groove 314. In this embodiment, a third groove 362 is formed on an inner surface of the first sliding member 360. The third groove 362 is also arced and corresponds to the center O. The hinge 300 further includes a second sliding member 370. In this embodiment, the second sliding member 370 is arced and has a shape corresponding to the third groove 362. The second sliding member 370 is disposed within the third groove 362 and slidable within the third groove 362. The second sliding member 370 is connected to an end of the first link 320. In this embodiment, the first link 320 and the second sliding member 370 are integrally formed. Thus, the first link 320 rotates about the center O (the first axis L1) through the second sliding member sliding within the third groove 362 and the first sliding member 360 sliding within the second groove 314. Therefore, the first sliding member 360 and the second sliding member 370 form a two-stage rotation structure. In this embodiment, an arced rib 372 is disposed on a lateral surface of the second sliding member 370, and an arced guiding groove 364 is formed on an inner surface of the third groove 362. When the second sliding member 370 slides along the third groove 362 until the arced rib 372 abuts an end of the guiding groove 364, the second sliding member 370 moves the first sliding member 360 to slide within the second groove 314 through engagement of the arced rib 372 with the arced guiding groove 364. The first link 320 extends along a first direction S which is perpendicular to the first axis L1. The first groove 322 extends in a direction parallel to the first direction S. In addition, the hinge 300 further includes a cover 30. When the first sliding member 360 and the second sliding member 370 are mounted into the second groove 314, the cover 30 covers a lateral side of the second groove 314 and keeps the first sliding member 360 to slide within the second groove 314.

The second link 330 has a through hole 332 at one end and has a post 334 at the other end. A stopping member 336 is disposed on the second link 330 and near the post 334. A screw hole 316 is formed on a lateral side of the main body 312. A bolt 5 passes through the through hole 332 and screws into the screw hole 316 so that the second link 330 is rotatably joined to base 310 and capable of rotating about the bolt 5. The second axis L2 is defined to pass through the bolt 5. The second link 330 is rotatable about the second axis L2. In this embodiment, the first axis L1 is parallel to the second axis L2.

The third link 340 has a through hole 341 at the first end 342 and has a post 345 at the second end 344. A stopping member 346 is disposed on the third link 340 and near the through hole 341. The post 334 of the second link 330 is rotatably joined to the through hole 341 so that the second link 330 can rotate relative to the third link 340. In addition, the post 345 is slidably joined to the first groove 322 of the first link 320.

In this embodiment, the elastic member 350 is a torsion spring and disposed in a position where the second link 330 is pivoted to the third link 340. Two ends of the torsion spring are propped against to the second link 330 and the third link 340. The elastic member 350 is disposed on the post 334 of the second link 330 and fixed to the post 334 by a C clip. One end of the torsion spring is inserted into the stopping member 336 of the second link 330, and the other end of the torsion spring abuts the stopping member 346 of the third link 340. When an external force exerts on the third link 340 to rotate the third link 340 relative to the second link 330, the elastic member 350 deforms elastically. When the external force is removed, the elastic force of the elastic member 350 exerts on the third link 340 to rotate the third link 340 relative to the second link 330 by an angle.

In this embodiment, the hinge 300 further includes a friction washer 380 and a spring washer 390. The friction washer 380 is disposed in a position where the second link 330 is pivoted to the base 310 and disposed between the second link 330 and the base 310. The spring washer 390 is disposed between the second link 330 and a head of the bolt 5. When the bolt 5 is screwed into the base 310, the friction washer 380 is sandwiched between the second link 330 and the base 310, and the spring washer 390 is pressed to deform elastically. Elastic force of the spring washer 390 exerts on the second link 330 so that the friction washer 380 is held between the second link 330 and the base 310 more tightly. The friction washer 380 provides friction force for the second link 330. When the second link 330 rotates about the second axis L2, the second link 330 can be positioned in an arbitrary position by the friction force from the friction washer 380.

Figure 5:
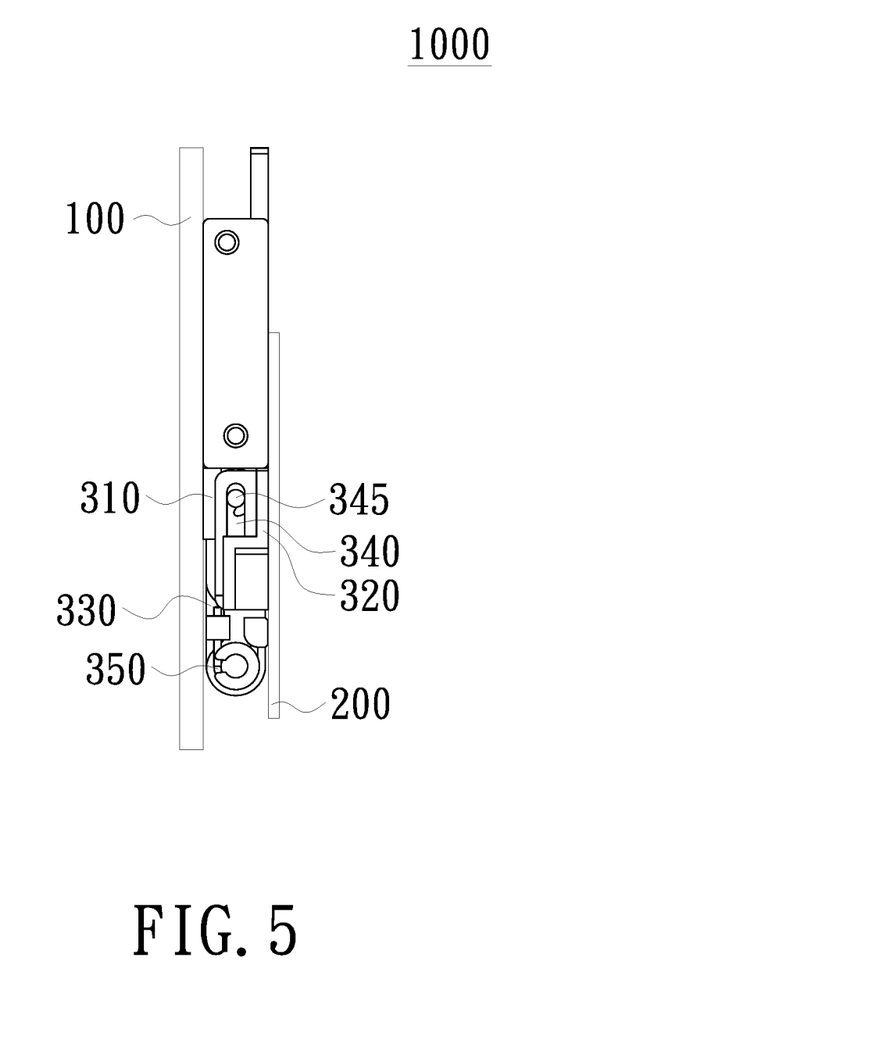
FIGS. 5-8 are side views of the hinge of FIGS. 3A and 3B mounted to the electronic device of FIGS. 2A and 2B and show rotation of the hinge when the stand is rotated.
Figure 6:
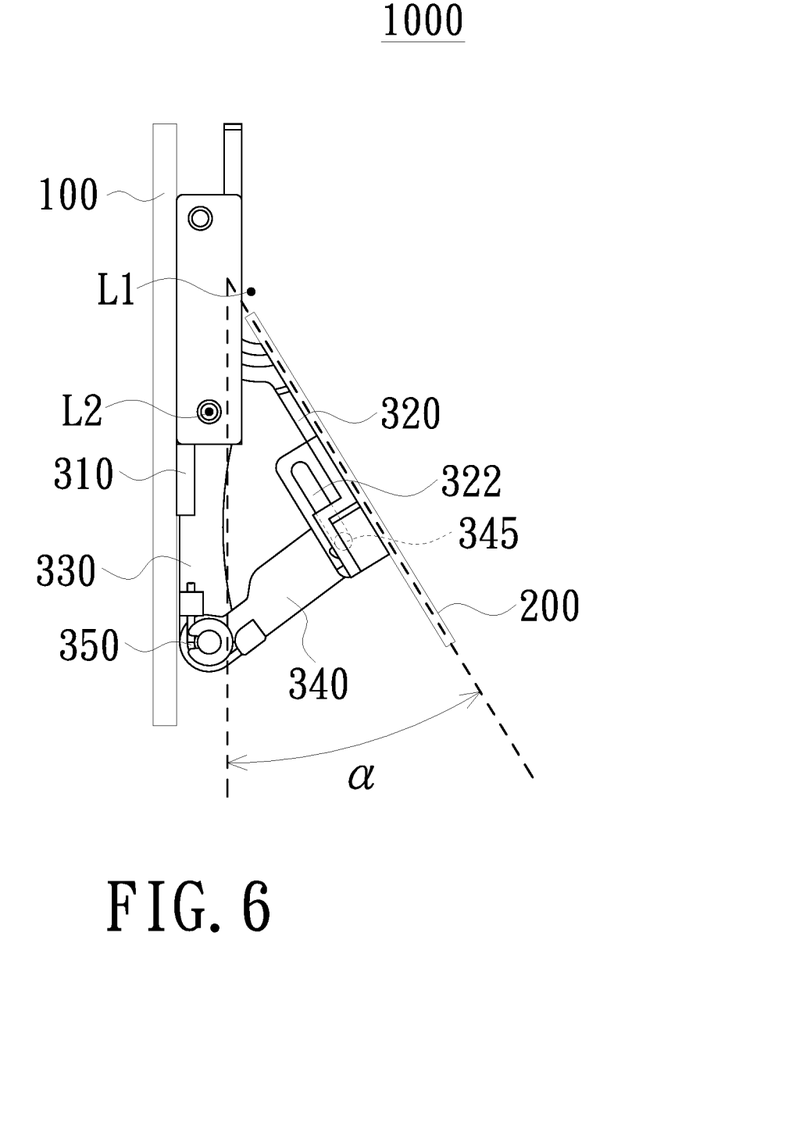

The application of the hinge 300 for the electronic device 1000 is described as follows. Referring to FIGS. 5-8, the main body 100 is connected to the base 310, and the stand 200 is connected to the first link 320. As shown in FIG. 5, the first link 320, the second link 330 and the third link 340 are rotated to become parallel to the base 310 so as to enable the stand 200 to be received in the main body 100 and the elastic member 350 deforms elastically at this time. The stand 200 is positioned to the main body 100 by a latch (not shown). When a user uses the electronic device 1000, the electronic device 1000 is held by only one hand of the user (see FIG. 2A). When the latch is released, as shown in FIG. 6, elastic force of the elastic member 350 exerts on the second link 330 and the third link 340. The second link 330 is pushed by the elastic force to abut the main body 100, and the third link 340 is however rotated by the elastic force. Since the post 345 of the third link 340 is slidable within the first groove 322 of the first link 320, the rotation of the third link 340 drives the post 345 to move along the groove 322 so that the first link 320 rotates about the first axis L1 and moves relative to the third link 340 simultaneously until the post 345 is stopped by an end of the groove 322. At this time, the first link 320 and the base 310 form a first angle α therebetween, and thus an angle between the stand 200 mounted to the first link 320 and the main body 100 mounted to base 310 is also the first angle α. In this embodiment, the first angle α may be 30° to facilitate operation of the electronic device 1000, such as viewing images in the display of the electronic device 1000.

Figure 7:
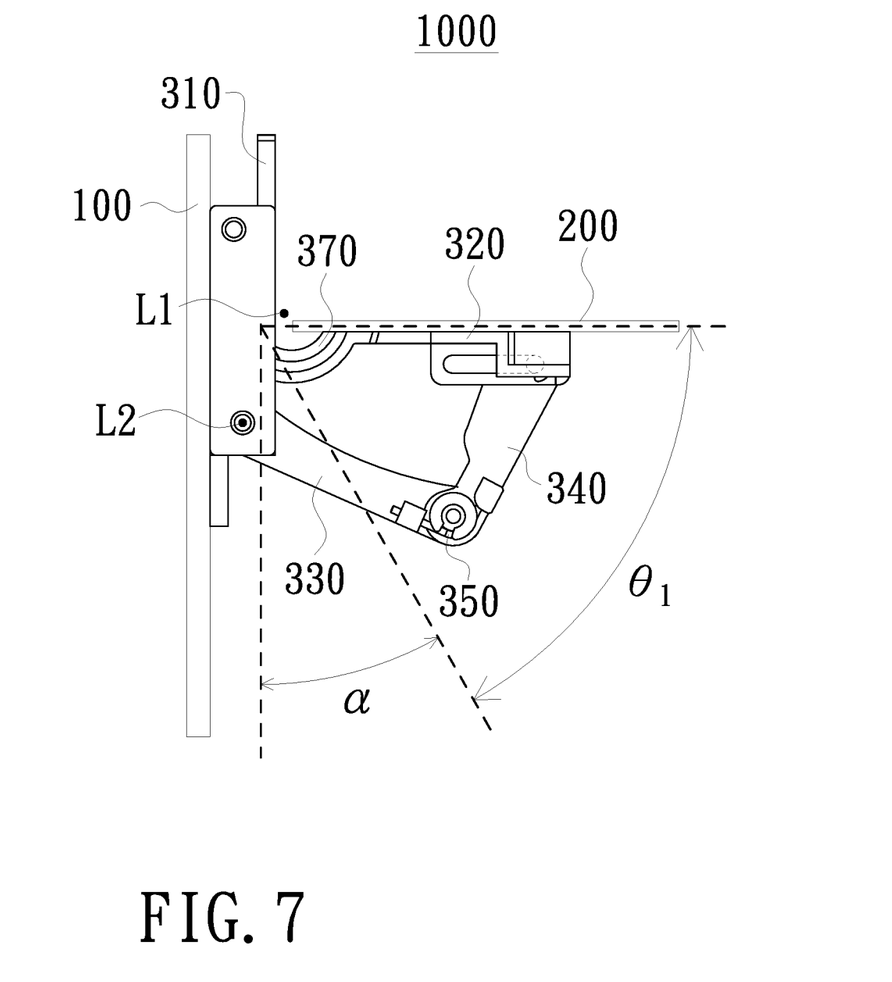
Figure 8:
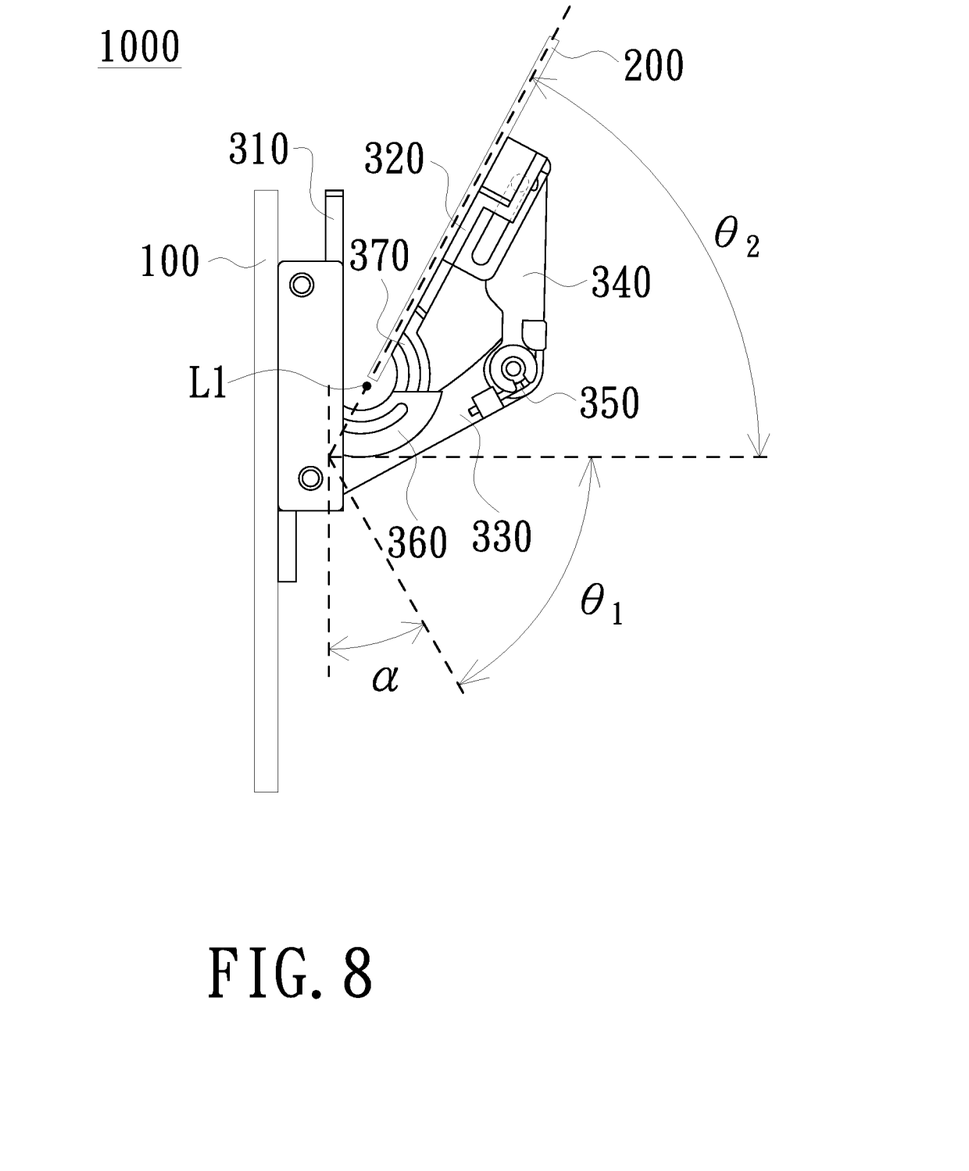

In addition, when the user would like to rotate the stand 200 to a larger angle, as shown in FIG. 7, the second link 330 rotate about the second axis L2, and the first sliding member 360 and the second sliding member 370 slide within the second groove 314 and the third groove 362 respectively so that the first link 320 rotates relative to the base 310 about the first axis L1 in an first angular range $\theta_1$. In this embodiment, the first angular range $\theta_1$ ranges from 30° to 90°, that is 30°≤$\theta_1$≤90°. As shown in FIG. 8, the first sliding member 360 and the second sliding member 370 continue to slide within the second groove 314 and the third groove 362 respectively. When the first sliding member 360 slides to a limiting position in the second groove 314 and stops there, the second sliding member 370 continues to slide within the third groove 362 so that the first link 320 continues to rotate relative to the base 310 about the first axis L1 in a second angular range $\theta_2$ and reaches a maximum angle finally. In this embodiment, the second angular range $\theta_2$ ranges from 90° to 150°, that is 90°≤$\theta_2$≤150°.

The hinge 300 of the invention utilizes the elastic member 350 disposed between the second link 330 and the third link 340 to rotate the stand 200 to a predetermined angle, that is the first angle α. The operation for rotating the stand 200 to the predetermined angle needs less than two steps, and this facilitates the usage of the electronic device 1000. A virtual axis formed by the first sliding member 360 and the second sliding member 370 slidable within the second groove 314 and the third groove 362 provides a seamless structure between the stand 200 and the main body 100.

While the present disclosure has been described in terms of what is presently considered to be the most practical and preferred embodiments, it is to be understood that the present disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A hinge, comprising:
    a base;
    a first link, pivoted to the base in a first pivot position and rotatable about a first axis extending through the first pivot position, wherein the first link comprises a first groove;
    a second link, pivoted to the base in a second pivot position and rotatable about a second axis extending through the second pivot position;
    a third link, comprising a first end pivoted to the second link and a second end slidably joined to the first groove; and
    an elastic member, disposed between the second link and the third link, wherein the elastic member is propped against the second link and the third link.

2. The hinge according to claim 1, wherein the elastic member is a torsion spring and disposed in a position where the second link is pivoted to the third link, and the torsion spring comprises two ends propped against the second link and the third link respectively.

3. The hinge according to claim 1, wherein the first link extends in a first direction perpendicular to the first axis, and the first groove extends in a direction parallel to the first direction.

4. The hinge according to claim 1, wherein the elastic member enables the third link to rotate relative to the second link and enables the first link to rotate relative to the base until the second end of the third link is stopped by an end of the first groove, and a first angle is formed between the first link and the base when the second end is stopped by the end of the first groove.

5. The hinge according to claim 4, wherein the first angle is 30°.

6. The hinge according to claim 1, further comprising a first sliding member coupled to the first link via a second sliding member, wherein the second sliding member is connected to the first link, the base comprises a second groove arced in shape and corresponding to a center passed through by the first axis, and the first sliding member is adapted to slide within the second groove so as to rotate the first link relative to the base about the first axis.

7. The hinge according to claim 6, wherein the first link rotates relative to the base about the first axis in a first angular range.

8. The hinge according to claim 7, wherein the first angular range ranges from 30° to 90°.

9. The hinge according to claim 6, wherein the first sliding member comprises a third groove arced in shape and corresponding to the center, and the second sliding member is adapted to slide within the third groove so as to rotate the first link relative to the base about the first axis.

10. The hinge according to claim 9, wherein the first link rotates relative to the base about the first axis in a second angular range.

11. The hinge according to claim 10, wherein the second angular range ranges from 90° to 150°.

12. The hinge according to claim 6, further comprising a cover covering a lateral side of the second groove to keep the first sliding member to slide within the second groove.

13. The hinge according to claim 1, further comprising a friction washer and at least one spring washer, wherein the friction washer is disposed in a position where the second link is pivoted to the base and sandwiched between the second link and the base, and the spring washer is disposed in the position where the second link is pivoted to the base and the spring washer is against the second link.

14. The hinge according to claim 1, wherein the first axis is parallel to the second axis.

15. An electronic device, comprising:
 a main body;
 a stand; and
 a hinge as claimed in claim 1, wherein the stand is connected to the first link, and the main body is connected to the base.

16. The electronic device according to claim 15, further comprising a latch latching the stand to the main body when the first link is rotated to overlap the base.

* * * * *